May 6, 1952 R. E. THOMAS 2,595,552
PHOTOMULTIPLIER COINCIDENCE CIRCUIT
Filed Sept. 7, 1950
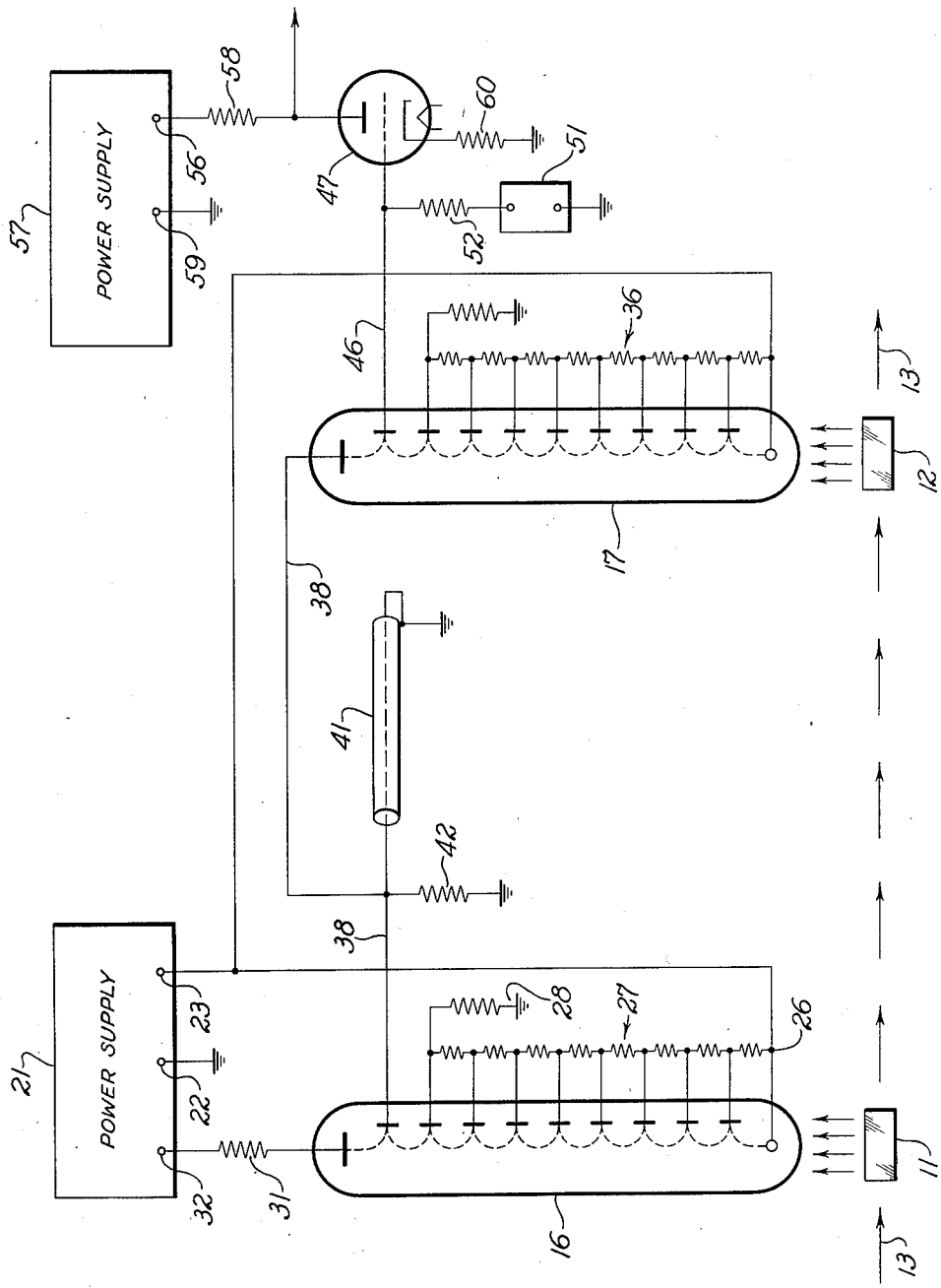
INVENTOR.
ROBERT E. THOMAS
BY
Roland A. Anderson
ATTORNEY.

Patented May 6, 1952

2,595,552

UNITED STATES PATENT OFFICE 2,595,552

PHOTOMULTIPLIER COINCIDENCE CIRCUIT

Robert E. Thomas, Berkeley, Calif., assignor to the United States of America as represented by the United States Atomic Energy Commission Application September 7, 1950, Serial No. 183,633

6 Claims. (Cl. 250—220)

This invention relates to a coincidence circuit and more particularly to a photomultiplier coincidence circuit for use with scintillating crystal indicators.

There are several methods in use for determining the presence of charged particle radiation. One such method is the use of crystals of fluorescent material having properties such that light is emanated from the crystalline structure when bombarded by charged particles. While this method is very accurate and sensitive, it has been found that the duration of such light pulses is extremely short and of low intensity. Photomultiplier tubes have been developed which are sensitive to such light pulses, but there remains the problem of developing electronic circuits which are capable of suitably resolving the light pulses. This latter is even more important in coincidence counting where it is desired to determine radiation in any given direction.

The present invention utilizes a pair of conventional photomultiplier tubes, each excited from separate suitably spaced scintillation type crystals. A section of short-circuited transmission line is connected between the last dynode of one tube and the anode of the other tube and ground. Such connection serves to trigger the second tube so that the voltage developed at the last dynode of the second tube is available to operate a counter.

It is therefore an object of the present invention to provide a new and improved coincidence circuit.

Another object of the present invention is to provide a coincidence circuit utilizing a pair of photomultiplier tubes excited by separate light sources to provide a single output voltage when such excitation occurs substantially simultaneously at each tube.

Still another object of the invention is to provide a coincidence circuit utilizing two photomultiplier tubes with the final dynode of one tube connected to the anode of the other and a section of short-circuited delay line connected from such connection to ground so that the one tube gates the other.

Another object of the invention is to provide a section of coaxial transmission line connected to the output of one photomultiplier tube for developing a voltage pulse of predetermined duration to bias the anode of a second photomultiplier tube so that an output voltage is developed in response to light striking each tube within the duration period.

A further object of the present invention is to provide a simple coincidence circuit using standard commercial elements well within their ratings.

Other objects and advantages of the invention will be apparent from the following description and claims considered together with the accompanying drawing in which there is illustrated a schematic wiring diagram of a preferred embodiment of the invention.

Referring to the drawing in detail, a pair of crystals 11 and 12, such as naphthalene or trans-stilbene, are disposed in spaced apart relation on a linear path 13, along which it is desired to determine the level of radiation. Positioned adjacent to each of the crystals 11 and 12 is one of a pair of conventional nine-stage photomultiplier tubes 16 and 17 in such a manner that light resulting from radiation bombardment of the crystals falls upon the light-sensitive cathode of the respective tube.

A conventional power supply 21 is utilized to furnish the necessary operating potentials for the circuit by grounding the positive terminal 22 and connecting the negative terminal 23 to one end 26 of a resistance voltage divider 27, the other end 28 of which is grounded. The end 26 of the voltage divider 27 is connected to the cathode of the tube 16 while suitably spaced taps along the voltage divider are connected to each of the first eight of the dynodes of the tube. The anode of the tube 16 is connected to a resistor 31 which, in turn, is connected to the positive terminal 32 of the power supply 21.

To supply suitable potentials to the tube 17 a resistance voltage divider 36 is connected in parallel with the voltage divider 27. The cathode and first eight dynodes of the tube 17 are connected to taps along the voltage divider 36 in the same manner as described for the tube 16. The two tubes 16 and 17 are provided with an interconnecting circuit; that is, the final or ninth dynode of the tube 16 is directly connected to the anode of the tube 17 by a lead 38 which is connected to the central conductor of a section of short-circuited coaxial transmission line 41 and to one end of a resistor 42. The other end of the resistor 42 and the short circuit end of the transmission line 41 are grounded. It will be noted that in the form of the invention illustrated in the drawing that a coaxial transmission line is shown; however, it will be readily appreciated that an artificial transmission line, comprising lumped constants, may be substituted therefor.

A lead 46 connected to the final dynode of the tube 17 is connected to the control grid of an amplifier tube 47. A bias supply 51 having its negative terminal grounded and its positive terminal connected to the lead 46 through a limiting resistor 52 supplies a suitable potential to both the final dynode of tube 17 and the grid of the tube 47. Operating potential is supplied to the tube 47 by connecting the anode thereof to the positive terminal 56 of a conventional power supply 57 through a dropping resistor 58. The negative terminal 59 of the power supply 57 is grounded and the cathode of the tube 47 is connected to ground through a resistor 60 to complete the connections of the circuit. The output of the circuit may then be taken from the anode or the cathode of the tube 47 depending upon the polarity of output voltage desired.

Now consider the operation of the tube 16 with the power supply 21 suitably energized to furnish the necessary operating potentials to the tube. Under such condition and upon the occurrence of scintillation in the crystal 11 caused by the passage of a charged particle therethrough, light striking the light sensitive cathode of the tube 16 will cause electron emission therefrom. Such emission is then successively increased at each dynode of the tube until finally reaching the anode. It will be noted that the eighth dynode is biased negatively by the voltage divider 27 connection and that the ninth dynode is normally at ground potential by reason of the connection to ground through the resistor 42. At the time the emission of the tube 16 reaches the ninth dynode a flow of current occurs through the resistor 42 thereby raising the potential of the dynode above ground. Since the transmission line 41 is connected in parallel with the resistor 42, a positive voltage appears at the ungrounded end thereof. Thus the line 41 becomes charged by the positive voltage and at a later time, equivalent to the time constant which may easily be determined by using well-known transmission line formulae, a reflected voltage wave occurs at the short-circuited end of the line to discharge the line. From this it will be seen that a positive pulse of voltage is developed at the input end of the transmission line 41 which has a duration of two times the time constant of the line.

Next, consider the operation of the tube 17, apart from the connection to tube 16, with the power supplies 51 and 57 suitably energized to furnish the necessary operating potentials to the tube 17. Scintillation at the crystal 12, caused by a charged particle, results in light falling on the sensitive cathode of the tube 17 which then emits electrons. Such emission is then progressively attracted to successive dynodes where the emission is increased at each stage or dynode. It is to be noted that the connections of the ninth dynode and the anode of the tube 17 are such that the dynode is normally biased positively to attract emission from the eighth dynode whereas the anode is normally at ground potential so that emission from the ninth dynode is prevented from reaching the anode. Thus the ninth dynode normally serves as the anode for the tube 17 and current flow through the resistor 52 is in such a direction as to place a negative bias on the control grid of the tube 47. The negative bias at the control grid of the normally non-conducting tube 47 will have no effect upon the operation thereof.

From the foregoing it will be apparent that, when a charged particle passes through both of the crystals 11 and 12 and the time of flight between the crystals is less than twice the time constant of the transmission line 41, the positive voltage across the line 41 is applied to the anode of the tube 17. Under this condition the ninth dynode of the tube 17 no longer serves as an anode for the tube and the emission is attracted from the ninth dynode to the anode. Thus the current flow through the resistor 52 is reversed and a positive pulse of voltage is impressed at the control grid of the tube 47 which then conducts causing a negative pulse of voltage at the anode and a positive pulse at the cathode. Either the cathode or the anode may then be connected to a conventional counting circuit to record the number of coincidences.

Thus there is provided a coincidence circuit which is simple in construction and use, and is capable of resolving the pulses of light from the crystals into electrical pulses which may be readily counted. It will be readily apparent that an electronic circuit, such as a one-shot multivibrator, may be used in the place of the transmission line 41; however, such substitution would only serve to complicate the simple device of the present invention.

While the salient features of the invention have been described in detail with respect to one embodiment it will, of course, be apparent that numerous modifications may be made within the spirit and scope of this invention and it is therefore not desired to limit the invention to the exact details shown and described except as they may be defined in the following claims.

What is claimed is:

1. In a coincidence circuit, the combination comprising a first multi-electrode photomultiplier tube, a second multi-electrode photomultiplier tube, delay means connected to the penultimate electrode of said first tube and to the last electrode of said second tube for impressing a delayed positive voltage on said last electrode in response to current flow at said penultimate electrode, means connected to the penultimate electrode of said second tube for impressing a positive voltage thereat, means connected to the remaining electrodes of said first and second tubes for supplying operating voltages thereto, and output means connected to the penultimate electrode of said second tube.

2. In a coincidence circuit, the combination comprising a first multi-electrode photomultiplier tube, a second multi-electrode photomultiplier tube, a direct connection being made between the penultimate electrode of said first tube and the last electrode of said second tube, a section of short-circuited coaxial transmission line having the central conductor thereof connected to said direct connection, means connected to the penultimate electrode of said second tube for impressing a positive voltage thereat, means connected to the other electrodes of said tubes for supplying operating voltages thereto, and an output circuit connected to the penultimate electrode of said second tube.

3. In a coincidence circuit, the combination comprising a first multi-electrode photomultiplier tube, a second multi-electrode photomultiplier tube, a section of coaxial transmission line having one end short circuited and the other end open, the short circuited end of said line being grounded and the central conductor at the open end being connected to the penultimate electrode of said first tube and to the last electrode of said second tube, means connected to the penultimate electrode of said second tube for impressing a positive voltage thereat, means connected to the other electrodes of said tubes for supplying operating voltages thereto, and an output circuit connected to the penultimate electrode of said second tube.

4. In a coincidence circuit, the combination comprising a first multi-electrode photomultiplier tube, a second multi-electrode photomultiplier tube, a section of coaxial transmission line of predetermined length having one end short circuited and the other end open, the short circuited end of said line being grounded and the central conductor at the open end being connected to the penultimate electrode of said first tube and to the last electrode of said second tube, a resistor connected between the open end of said line and ground, voltage means connected to the penultimate electrode of said second tube through a resistor for impressing a positive bias, means connected to the other electrodes of said tubes for supplying operating voltages thereto, and an output circuit connected to the penultimate electrode of said second tube.

5. In a coincidence circuit, the combination comprising a first and second source of light disposed in spaced-apart relation along a linear path, said sources being energized by charged particles, a first photomultiplier tube having a plurality of electrodes disposed to receive light from said first source, a second photomultiplier tube having a plurality of electrodes disposed to receive light from said second source, a section of coaxial transmission line having one end short circuited and the other end open, the open end of said line being connected to the penultimate electrode of said first tube and to the last electrode of said second tube, means connected to said line for developing a voltage proportional to current flow at the penultimate electrode of said first tube, means connected to the penultimate electrode of said second tube for impressing a positive voltage, means connected to the other electrodes of said tubes for supplying operating voltages thereto, and an output circuit connected to the penultimate electrode of said second tube.

6. In a coincidence circuit, the combination comprising a first and second source of light disposed in spaced-apart relation along a predetermined linear path, said sources being energized by charged particles, a first multi-electrode photomultiplier tube disposed to receive light from said first source, a second multi-electrode photomultiplier tube disposed to receive light from said second source, a section of coaxial transmission line having one end short circuited and the other end open, the time constant of said line being at least half of the time of flight of charged particles between said sources, the open end of said line being connected to the penultimate electrode of said first tube and to the last electrode of said second tube, means connected to said line for developing a voltage proportional to current flow at the penultimate electrode of said first tube, means connected to the penultimate electrode of said second tube for impressing a positive voltage through a resistor, means connected to the other electrodes of said tubes for supplying operating voltages thereto, and an output circuit connected to the penultimate electrode of said second tube.

ROBERT E. THOMAS.

REFERENCES CITED

The following references are of record in the file of this patent:

UNITED STATES PATENTS

| Number | Name | Date |
|---|---|---|
| 2,484,352 | Miller et al. | Oct. 11, 1949 |
| 2,517,404 | Morton | Aug. 1, 1950 |

OTHER REFERENCES

"Communication Engineering," Everitt, McGraw-Hill Book Co. Inc., New York 1937, pgs. 134–146.

"A Metastable State of 22 Microseconds in $Ta^{181}$," Benedetti et al. Physical Review (1946), vol. 70, pg. 569.